G. H. POUNDER.
HARROWS.
No. 180,498. Patented Aug. 1, 1876.
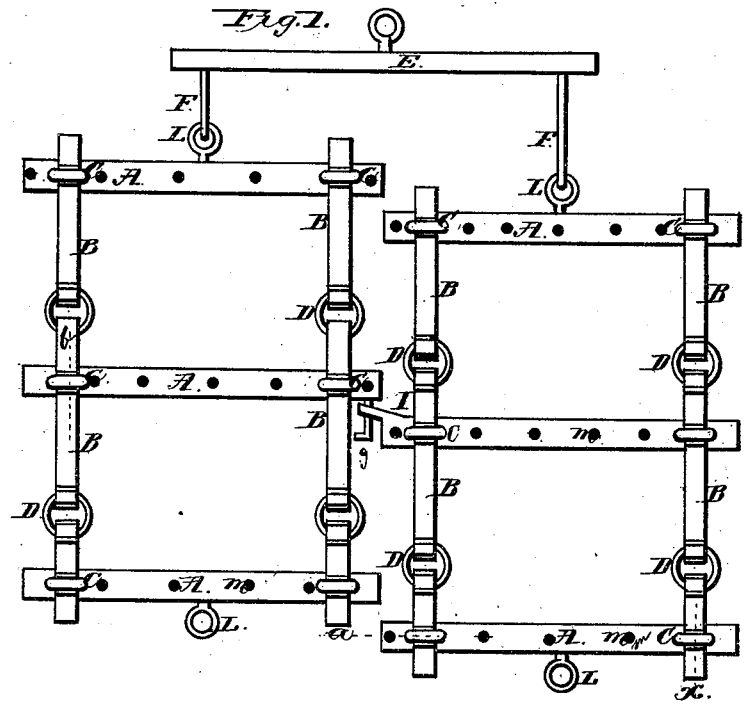
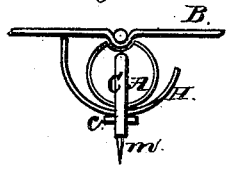
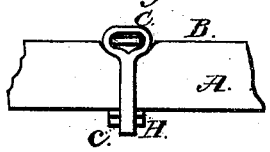
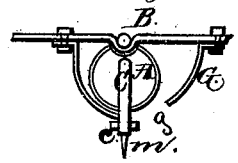
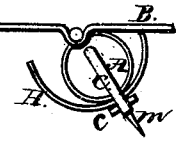
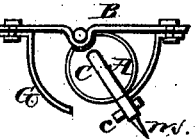
Witnesses:
Thomas Crane
D. B. Peck
Inventor.
Geo. H. Pounder.

UNITED STATES PATENT OFFICE.

GEORGE H. POUNDER, OF FORT ATKINSON, WISCONSIN.

IMPROVEMENT IN HARROWS.

Specification forming part of Letters Patent No. 180,498, dated August 1, 1876; application filed April 1, 1876.

*To all whom it may concern:*

Be it known that I, GEORGE H. POUNDER, of Fort Atkinson, Wisconsin, have invented certain Improvements in Harrows, of which the following is a specification:

The object of my invention in harrows is to make more efficient the operation of the use of self-adjustable couplings, so arranged upon the toothed bars that when the harrow is drawn in one direction the teeth are vertical, and when drawn in the opposite direction they are inclined.

Another object is to make the joints of the couplings between each bar detachable, all of which I now proceed to describe in detail.

Figure 1 is a plan view of my harrow. The parallel bars A A are composed of metallic tubes filled with wood, and are coupled together by loop-bolts C, and plates B, united by links D, a section of which is shown in Fig. 7. Holes are drilled for bolts C and teeth m, through the tubes, after being filled with wood. The teeth m are driven tight through the wood, but are made merely to fill the holes in the metal, thereby preventing their working loose by use or decay.

Fig. 2 is a vertical section of bar A, at dotted line a, Fig. 1, with loop-bolt C inserted through it, the loop being in a line parallel with bar A, showing plate B within the loop; also nut C and brace H upon the end of bolt C.

Fig. 3 is a vertical transverse section of bar A, at dotted line b, Fig. 1, in which is shown coupling-plate B, inserted in and by a semicircle clasping the upper part of loop C, forming a bearing in which the loop C may turn, and thus form an axis for bar A. Upon the opposite end of loop-bolt C is placed what what I call check-brace H, which is firmly held to bar A by nut C.

It will be observed that the ends of check-brace H, each side of bolt C, are of unequal length. One end, as illustrated, comes in contact with the coupling-plate B, forming a brace in that direction, while the teeth in bar A are in a perpendicular position.

The change from this to an angular position of the teeth is illustrated in Fig. 6, the angle being governed by check-brace H coming into contact with coupling-plate B on the opposite side of bar A.

Fig. 4 is a vertical transverse section of bar A, at dotted line x. The brace G is firmly secured at both ends to coupling-plate B, while the lower end of loop-bolt C passes through slot g in brace G, in which it works freely. The length of the slot fixes the distance of movement of bar A upon its axis, thereby giving to the teeth m a uniform position.

Fig. 5 represents the change from a vertical to an inclined position of the teeth m, the lower end of loop-bolt C being moved to the opposite end of slot g, the operation of which I shall more fully explain hereafter. I, Fig. 1, is a loop attached firmly to and projecting from the end of bar A, in one section of the harrow into which is placed the hook J secured to and projecting from the bar A in the opposite section. This forms a hinge, coupling the two sections together, the hole through loop I being elongated vertically, so as to allow each section to rise and fall, working, in a measure, independent of each other, yielding to the uneven surface of the ground. E, Fig. 1, is a draw-bar, which connects the two sections in front by means of draw-rods F attached to eyes L.

Fig. 7 is a section of coupling-plates B, showing the manner of attachment of links D.

It will be observed that one plate is promanently clasped to link D, while the other is hooked into it and secured from unhooking by means of bolt e being placed in plate B, so the passage into the hook is filled by the head of the bolt.

It will also be observed that the bars A may be made to pass between each other at their inner ends, so the teeth can be placed to follow each other so nearly that the whole surface of the ground will be stirred.

When it is desired to change from vertical to inclined teeth, or vice versa, detach the rods F from eyes L, and hook them to eyes L at the other end of the harrow.

It will be evident by this means the resistance of the teeth in the ground will turn the bars A on their axis until stopped by check-brace H, and brace G, as described. I use the brace G on the front and hind bars A for the reason that the draft coming only upon one end of the plate B needs more strength at that point. The check-brace H I use on the intermediate bars, they being manufactured cheaper. Six bars in a section are my usual number for a common harrow, but for special uses, some of the bars may be detached by removing bolt e, and unhooking the links D, as described.

Having fully described my invention, and explained the principles on which it acts, and mode by which it is operated, what I claim as new therein, and desire to secure by Letters Patent, is—

1. In a harrow the bars A, united at their top by a hinge-joint, as described, in combination with stop-braces H G, substantially as described, and for the purpose specified.

2. Coupling-plates B, and links D, in combination with bolt e, substantially as described, for the purpose specified.

GEO. H. POUNDER.

Witnesses:
THOMAS CRANE,
D. B. PECK.